US009886647B1

(12) United States Patent
Gusarov

(10) Patent No.: US 9,886,647 B1
(45) Date of Patent: Feb. 6, 2018

(54) IMAGE SEGMENTATION FOR OBJECT MODELING

(71) Applicant: SNAP INC., Venice, CA (US)

(72) Inventor: Maksim Igorevich Gusarov, Venice, CA (US)

(73) Assignee: SNAP INC., Venice, CA (US)

(*) Notice: Subject to any disclaimer, the term of this patent is extended or adjusted under 35 U.S.C. 154(b) by 0 days.

(21) Appl. No.: 14/983,930

(22) Filed: Dec. 30, 2015

(51) Int. Cl.
G06K 9/00 (2006.01)
G06K 9/52 (2006.01)
G06T 7/60 (2017.01)
G06T 7/00 (2017.01)
G06K 9/46 (2006.01)

(52) U.S. Cl.
CPC ............ G06K 9/52 (2013.01); G06K 9/00711 (2013.01); G06T 7/0046 (2013.01); G06T 7/60 (2013.01); G06K 2009/4666 (2013.01)

(58) Field of Classification Search
CPC combination set(s) only.
See application file for complete search history.

(56) References Cited

U.S. PATENT DOCUMENTS

| 5,872,861 | A | * | 2/1999 | Makram-Ebeid ..... G06T 7/0012 128/922 |
| 6,038,295 | A | | 3/2000 | Mattes |
| 6,980,909 | B2 | | 12/2005 | Root et al. |
| 7,173,651 | B1 | | 2/2007 | Knowles |
| 7,411,493 | B2 | | 8/2008 | Smith |
| 7,535,890 | B2 | | 5/2009 | Rojas |
| 8,131,597 | B2 | | 3/2012 | Hudetz |
| 8,199,747 | B2 | | 6/2012 | Rojas et al. |
| 8,332,475 | B2 | | 12/2012 | Rosen et al. |
| 8,718,333 | B2 | | 5/2014 | Wolf et al. |
| 8,724,622 | B2 | | 5/2014 | Rojas |
| 8,874,677 | B2 | | 10/2014 | Rosen et al. |
| 8,909,679 | B2 | | 12/2014 | Roote et al. |
| 8,995,433 | B2 | | 3/2015 | Rojas |
| 9,040,574 | B2 | | 5/2015 | Wang et al. |
| 9,055,416 | B2 | | 6/2015 | Rosen et al. |
| 9,100,806 | B2 | | 8/2015 | Rosen et al. |

(Continued)

FOREIGN PATENT DOCUMENTS

CA 2887596 A1 7/2015

OTHER PUBLICATIONS

Leyden, John, "This SMS will self-destruct in 40 seconds", [Online]. Retrieved from the Internet: <URL: http://www.theregister.co.uk/2005/12/12/stealthtext/, (Dec. 12, 2005), 1 pg.

Primary Examiner — Alex Liew
(74) Attorney, Agent, or Firm — Schwegman Lundberg & Woessner, P.A.

(57) ABSTRACT

Systems, devices, and methods are presented for segmenting an image of a video stream with a client device by accessing a set of images within a video stream, identifying an object of interest within one or more images of the set of images, and detecting a region of interest within the one or more images. The systems, devices, and method identify a first set of median pixels in a first portion of the object of interest and a second set of median pixels in a second portion of the object of interest. The systems, devices, and methods determine a polyline approximating the first and second sets of median pixels and generate a model for the polyline.

18 Claims, 10 Drawing Sheets

(56) References Cited

U.S. PATENT DOCUMENTS

| | | |
|---|---|---|
| 9,100,807 B2 | 8/2015 | Rosen et al. |
| 9,191,776 B2 | 11/2015 | Root et al. |
| 9,204,252 B2 | 12/2015 | Root |
| 9,443,227 B2 | 9/2016 | Evans et al. |
| 9,489,661 B2 | 11/2016 | Evans et al. |
| 9,491,134 B2 | 11/2016 | Rosen et al. |
| 2011/0164794 A1* | 7/2011 | Zou .................. A61B 8/06 |
| | | 382/128 |
| 2011/0202598 A1 | 8/2011 | Evans et al. |
| 2012/0209924 A1 | 8/2012 | Evans et al. |

* cited by examiner

IMAGE SEGMENTATION FOR OBJECT MODELING

TECHNICAL FIELD

Embodiments of the present disclosure relate generally to automated image segmentation of a video stream. More particularly, but not by way of limitation, the present disclosure addresses systems and methods for segmenting a video stream to generate a model an object of interest depicted in a video stream.

BACKGROUND

Telecommunications applications and devices can provide communication between multiple users using a variety of media, such as text, images, sound recordings, and/or video recording. For example, video conferencing allows two or more individuals to communicate with each other using a combination of software applications, telecommunications devices, and a telecommunications network. Telecommunications devices may also record video streams to transmit as messages across a telecommunications network.

BRIEF DESCRIPTION OF THE DRAWINGS

Various ones of the appended drawings merely illustrate example embodiments of the present disclosure and should not be considered as limiting its scope.

Figure 1:
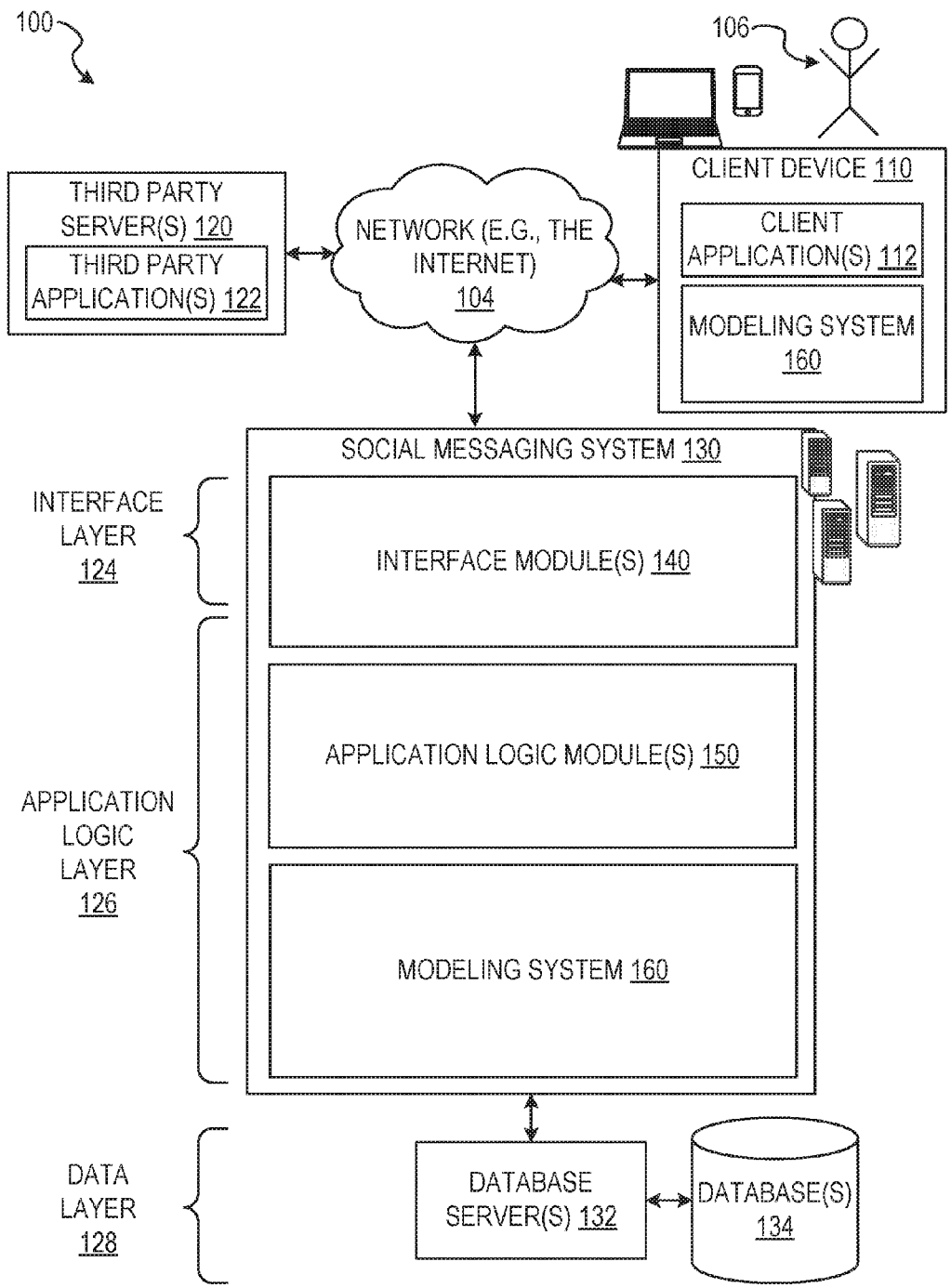
FIG. 1 is a block diagram illustrating a networked system, according to some example embodiments.

The headings provided herein are merely for convenience and do not necessarily affect the scope or meaning of the terms used.

DETAILED DESCRIPTION

The description that follows includes systems, methods, techniques, instruction sequences, and computing machine program products illustrative of embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

Although telecommunications applications and devices exist to provide two way video communication between two devices, there can be issues with video streaming, such as capturing, measuring, and modeling aspects within the video stream during a communication session. Methods generally accepted for editing or modifying video do not model or modify video or video communications as the video is being captured or the video communication is conducted. Accordingly, there is still a need in the art to improve video communications between devices.

In one embodiment, an application operating on a device includes a selectable user interface element to model portions of a user's face depicted within a video stream captured by the device. The application presents the video stream (e.g., a video stream during a communication session) to at a client device and generates a model of one or more portions of the user's face. Where the application captures one or more images within the video stream, the model may be generated as an average model. The average model may be an average of individual models generated for each of the images in the video stream.

The above is one specific example. The various embodiments of the present disclosure relate to devices and instructions by one or more processors of a device to model one or more objects of interest depicted within a video stream captured by the device. In some embodiments, the video stream is transmitted to another device while the video stream is being captured. In these embodiments, after modeling the one or more objects of interest, the video stream may be modified to represent a stylized version of the one or more objects of interest and transmitted in its modified form (e.g., modifying a video stream in real time). A modeling system is described that identifies and tracks objects of interest across a video stream and through a set of images comprising the video stream. In various example embodiments, the modeling system identifies and tracks one or more facial features depicted in a video stream. Although described with respect to facial features, it should be understood that the modeling system may track any object of interest, as discussed below.

FIG. 1 is a network diagram depicting a network system 100 having a client-server architecture configured for exchanging data over a network, according to one embodiment. For example, the network system 100 may be a messaging system where clients communicate and exchange data within the network system 100. The data may pertain to various functions (e.g., sending and receiving text and media communication, determining geolocation, etc.) and aspects (e.g., transferring communications data, receiving and transmitting indications of communication sessions, etc.) associated with the network system 100 and its users. Although illustrated herein as client-server architecture, other embodiments may include other network architectures, such as peer-to-peer or distributed network environments.

As shown in FIG. 1, the network system 100 includes a social messaging system 130. The social messaging system 130 is generally based on a three-tiered architecture, consisting of an interface layer 124, an application logic layer 126, and a data layer 128. As is understood by skilled artisans in the relevant computer and Internet-related arts, each module or engine shown in FIG. 1 represents a set of executable software instructions and the corresponding hardware (e.g., memory and processor) for executing the instructions, forming a hardware-implemented module or engine and acting, at the time of the execution of instructions, as a special purpose machine configured to carry out a particular set of functions. To avoid obscuring the inventive subject matter with unnecessary detail, various functional modules and engines that are not germane to conveying an understanding of the inventive subject matter have been omitted from FIG. 1. Of course, additional functional modules and engines may be used with a social messaging system, such as that illustrated in FIG. 1, to facilitate additional functionality that is not specifically described herein. Furthermore, the various functional modules and engines depicted in FIG. 1 may reside on a single server computer or client device, or may be distributed across several server computers or client devices in various arrangements. Moreover, although the social messaging system 130 is depicted in FIG. 1 as a three-tiered architecture, the inventive subject matter is by no means limited to such an architecture.

As shown in FIG. 1, the interface layer 124 consists of interface modules (e.g., a web server) 140, which receives requests from various client-computing devices and servers, such as client devices 110 executing client application(s) 112, and third party servers 120 executing third party application(s) 122. In response to received requests, the interface module 140 communicates appropriate responses to requesting devices via a network 104. For example, the interface modules 140 can receive requests such as Hypertext Transfer Protocol (HTTP) requests, or other web-based, Application Programming Interface (API) requests.

The client devices 110 can execute conventional web browser applications or applications (also referred to as "apps") that have been developed for a specific platform to include any of a wide variety of mobile computing devices and mobile-specific operating systems (e.g., IOS™, ANDROID™, WINDOWS@PHONE). Further, in some example embodiments, the client devices 110 form all or part of an modeling system 160 such that modules of the modeling system 160 configure the client device 110 to perform a specific set of functions with respect to operations of the modeling system 160.

In an example, the client devices 110 are executing the client application(s) 112. The client application(s) 112 can provide functionality to present information to a user 106 and communicate via the network 104 to exchange information with the social messaging system 130. Further, in some examples, the client devices 110 execute functionality of the modeling system 160 to segment images of video streams during capture of the video streams and transmit the video streams (e.g., with image data modified based on the segmented images of the video stream).

Each of the client devices 110 can comprise a computing device that includes at least a display and communication capabilities with the network 104 to access the social messaging system 130, other client devices, and third party servers 120. The client devices 110 comprise, but are not limited to, remote devices, work stations, computers, general purpose computers, Internet appliances, hand-held devices, wireless devices, portable devices, wearable computers, cellular or mobile phones, personal digital assistants (PDAs), smart phones, tablets, ultrabooks, netbooks, laptops, desktops, multi-processor systems, microprocessor-based or programmable consumer electronics, game consoles, set-top boxes, network PCs, mini-computers, and the like. User 106 can be a person, a machine, or other means of interacting with the client devices 110. In some embodiments, the user 106 interacts with the social messaging system 130 via the client devices 110. The user 106 may not be part of the networked environment, but may be associated with the client devices 110.

As shown in FIG. 1, the data layer 128 has database servers 132 that facilitate access to information storage repositories or databases 134. The databases 134 are storage devices that store data such as member profile data, social graph data (e.g., relationships between members of the social messaging system 130), image modification preference data, accessibility data, and other user data.

An individual can register with the social messaging system 130 to become a member of the social messaging system 130. Once registered, a member can form social network relationships (e.g., friends, followers, or contacts) on the social messaging system 130 and interact with a broad range of applications provided by the social messaging system 130.

The application logic layer 126 includes various application logic modules 150, which, in conjunction with the interface modules 140, generate various user interfaces with data retrieved from various data sources or data services in the data layer 128. Individual application logic modules 150 may be used to implement the functionality associated with various applications, services, and features of the social messaging system 130. For instance, a social messaging application can be implemented with of the application logic modules 150. The social messaging application provides a messaging mechanism for users of the client devices 110 to send and receive messages that include text and media content such as pictures and video. The client devices 110 may access and view the messages from the social messaging application for a specified period of time (e.g., limited or unlimited). In an example, a particular message is accessible to a message recipient for a predefined duration (e.g., specified by a message sender) that begins when the particular message is first accessed. After the predefined duration elapses, the message is deleted and is no longer accessible to the message recipient. Of course, other applications and services may be separately embodied in their own application logic modules 150.

As illustrated in FIG. 1, the social messaging system 130 may include at least a portion of the modeling system 160 capable of identifying, tracking, and modeling or modifying objects within video data during capture of the video data by the client device 110. Similarly, the client device 110 includes a portion of the modeling system 160, as described above. In other examples, client device 110 may include the entirety of modeling system 160. In instances where the client device 110 includes a portion of (or all of) the modeling system 160, the client device 110 can work alone or in cooperation with the social messaging system 130 to provide the functionality of the modeling system 160 described herein.

In some embodiments, the social messaging system 130 may be an ephemeral message system that enables ephemeral communications where content (e.g. video clips or images) are deleted following a deletion trigger event such as a viewing time or viewing completion. In such embodiments, a device uses the various modules described herein within the context of any of generating, sending, receiving, or displaying aspects of an ephemeral message. For example, a device implementing the modeling system 160 may identify, track, and model an object of interest, such as a set of eyebrows on a face depicted in the video clip. The device may modify the object of interest during capture of the video clip without image processing after capture of the video clip as a part of a generation of content for an ephemeral message.

Figure 2:
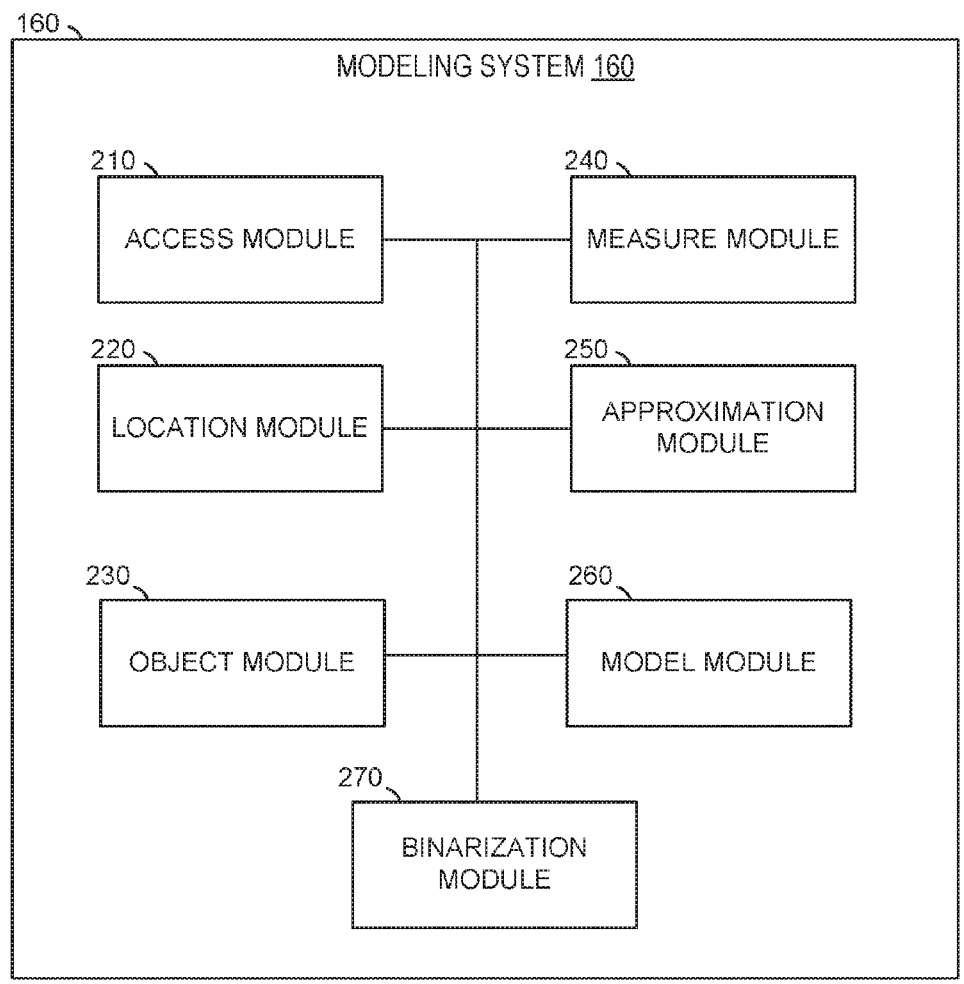
FIG. 2 is a diagram illustrating a modeling system, according to some example embodiments.

In FIG. 2, in various embodiments, the modeling system 160 can be implemented in conjunction with the client device 110 or as a standalone system, and is not necessarily included in the social messaging system 130. The modeling system 160 is shown to include an access module 210, a location module 220, an object module 230, a measure module 240, an approximation module 250, a model module 260, and a binarization module 270. All, or some, of the modules 210-270, communicate with each other, for example, via a network coupling, shared memory, and the like. Each module of modules 210-270 can be implemented as a single module, combined into other modules, or further subdivided into multiple modules. Other modules not pertinent to example embodiments can also be included, but are not shown.

The access module 210 receives or accesses a set of images (e.g., frames) in a video stream. In some embodiments, the access module 210 receives the set of images directly from an image capture device of the client device 110. In some instances, an application or module of the client device 110 passes the set of images to the access module 210 for use in one or more of the methods described herein.

The location module 220 performs locating operations within the modeling system 160. In various example embodiments, the location module 220 identifies and provides locations for one or more regions of interest depicted within images of a video stream (e.g., one or more frames of a video stream). The regions of interest, identified by the location module 220 are sized and shaped to include one or more object of interest identified by the object module 230. In some embodiments, the location module 220 may be a portion of a face tracking module or system. In some instances, where an object of interest is a portion of a face, the location module 220 identifies a location of one or more regions of interest to include the portion of the face identified as the object of interest. For example, where the location module 220 is configured to determined regions of interest surrounding eyebrows depicted on a face, the location module 220 may identify landmarks surrounding the eyebrows and approximated dimensions of the eyebrows to determine regions of interest which may encompass the eyebrows. Although in some embodiments, the regions of interest are referenced as rectangles, the regions of interest may be any suitable shape or combination of shapes, as described below. For example, the regions of interest may be represented as circular shapes, polygonal shapes, or an outline shaped and sized similarly to and including the object of interest (e.g., an outline of an eyebrow, a wall, a vehicle).

In some embodiments, the location module 220 performs cropping functions. For example, after determining one or more regions of interest within an image, the location module 220 crops the image, removing from consideration areas outside of the one or more regions of interest. In some instances, after cropping, the regions of interest are processed by one or more other modules of the modeling system 160.

The object module 230 identifies objects of interest within one or more images of the set of images within the video stream. In some embodiments, the object module 230 may be part of a facial recognition or facial tracking module. The object module 230 may identify the objects of interest based on object recognition operations (e.g., edge detection and shape recognition), facial recognition operations (e.g., identifying facial landmarks), or any other suitable operations. Where the object module 230 identifies the objects of interest based on facial recognition operations, the object module 230 may access a landmark library. The landmark library may be stored on the client device 110 or in a database (e.g., the database 134 of the social messaging system 130). The landmark library may include facial landmarks used by facial recognition operations to identify one or more portions of a face within the video stream. In some embodiments, the object module 230 may identify distinct portions of a single object of interest.

The measure module 240 identifies and measures one or more parameters of the one or more objects of interest identified by the object module 230. In some embodiments, the measure module 240 identifies median pixels representing a set of median points or a median line within the depicted area of the one or more objects of interest. The measure module 240 may identify an upper bound and a lower bound for the one or more objects of interest to identify sets of median pixels for each of the one or more objects of interest. In some instances, the measure module 240 determines a thickness of the one or more objects of interest. The measure module 240 may determine the thickness based on the upper bound and the lower bound determined for each of the one or more objects of interest and each portion identified for each of the one or more objects of interest.

The approximation module 250 performs one or more operations to approximate the one or more objects of interest identified by the object module 230. In some embodiments, the approximation module 250 determines one or more line to approximate the object of interest. For example, as described in more detail below, the approximation module 250 may generate and fit a polyline (e.g. a connected series of line segments or links), such as a two link polyline, to the median pixels identified by the measure module 240. The approximation module 250 may also determine bend positions and bend angles within the one or more objects of interest in order to fit the polyline to an object of interest. The approximation module 250 may also determine slope angles for each link in the polyline.

The model module 260 generates one or more models from parameters for the object of interest determined by the approximation module 250. In some embodiments, where the approximation module 250 determines the polyline, the model module 260 generates a model based on the polyline. The model module 260 may also take into account, lengths of portions of the polyline, bend angles, bend positions, slope angles, thicknesses, and other parameters determined by one or more of the approximation module 250 and the measure module 240. Where the methods described herein are performed on a video stream, the model module 260 may generate a consolidated model for the portion of the video stream on which the methods were performed. For example, where the methods are performed on a set of images of the video stream, the model module 260 may generate an average model based on an average of parameters determined for each image of the set of images.

The binarization module 270 generates binary images based on the set of images accessed by the access module 210. In some instances, the binarization module 270 generates one or more binarization matrices for the one or more images. The binarization matrices may represent binary versions of the one or more images. In some instances, the binarization module 270 performs one or more binarization operations to generate the binarization matrices. Although described below with specific examples of binarization operations, it should be understood that the binarization module 270 may perform any suitable binarization operations to generate the binarization matrices.

Figure 3:
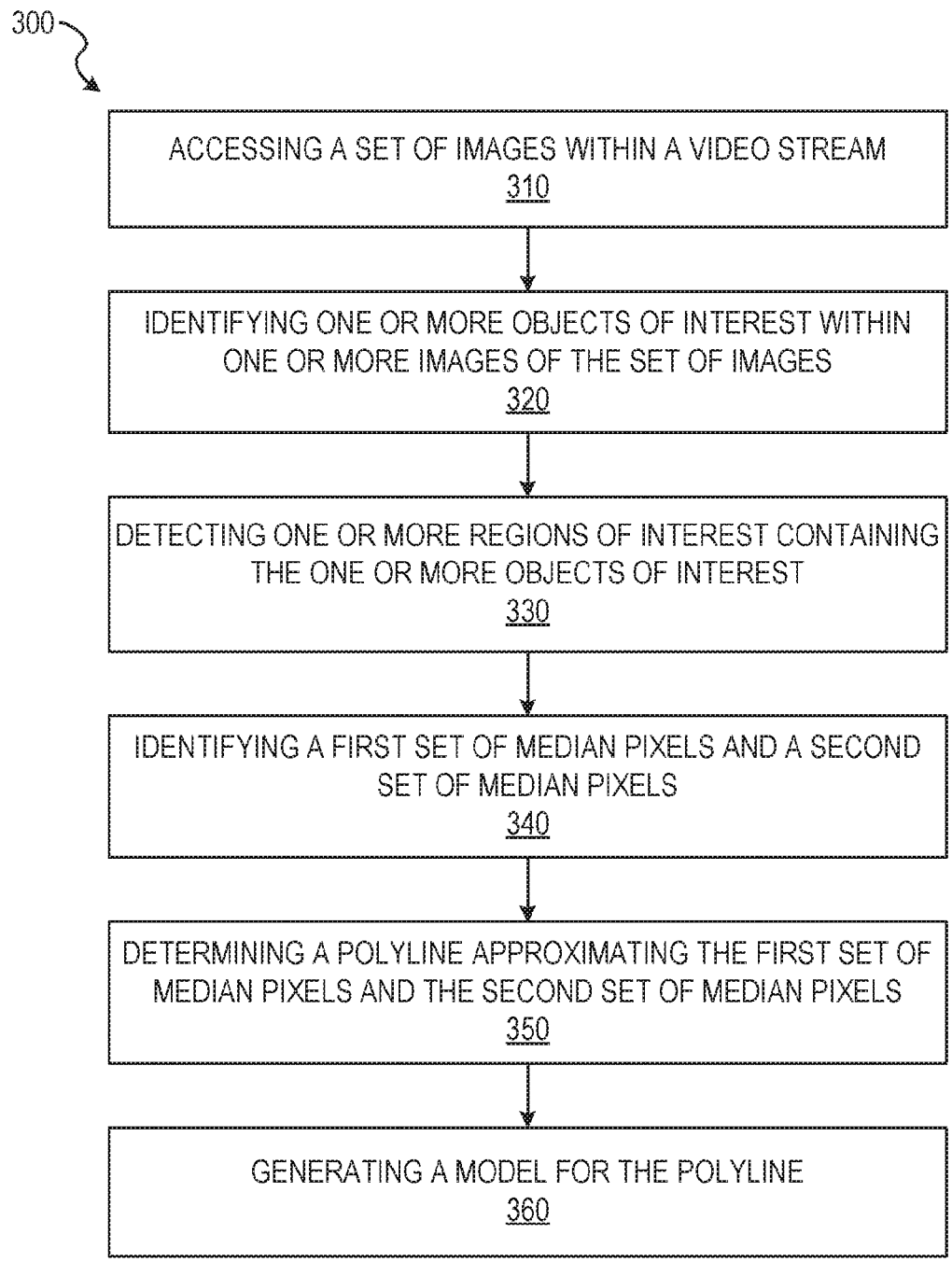
FIG. 3 is a flow diagram illustrating an example method for segmenting images within a video stream to model an object of interest based on the segmentation, according to some example embodiments.

FIG. 3 depicts a flow diagram illustrating an example method 300 for segmenting portions of a video stream and modifying portions of the video stream based on the segmentation. The operations of method 300 may be performed by components of the model system 160, and are so described below for purposes of illustration.

In operation 310, the access module 210 accesses a set of images within a video stream. In some instances, the access module 210 accesses the video stream captured by the image capture device associated with the client device 110 and presented on the user interface capture device as a portion of hardware comprising the access module 210. In these embodiments, the access module 210 directly receives the video stream captured by the image capture device. In some instances, the access module 210 passes all or part of the video stream (e.g., the set of images comprising the video stream) to one or more modules of the modeling system 160, as described below in more detail.

In operation 320, the object module 230 identifies an object of interest within one or more images of the set of images within the video stream. The object module 230 may perform one or more operations to identify and track objects within an image (e.g., a frame of the video stream). For example, the object module 230 may perform one or more object recognition operations on the one or more images. In some embodiments, the object module 230 includes facial tracking logic to identify all or a portion of a face within the one or more images and track landmarks of the face across the set of images of the video stream. In some instances, the object module 230 includes logic for shape recognition, edge detection, or any other suitable object detection mechanism. The object of interest may also be determined by the object module 230 to be an example of a predetermined object type, matching shapes, edges, or landmarks within a range to an object type of a set of predetermined object types.

Where the object module 230 uses landmarks (e.g., facial feature landmarks), the object module 230 may access a landmark library. For example, where the object module 230 is to detect eyebrows as the objects of interest, the object module 230 may access a facial landmark library containing predetermined landmarks around eyebrows depicted on a face. The object module 230 may determine the existence and location of eyebrows depicted within the video stream by identifying a subset of the facial landmarks around the eyebrow. The landmarks may be identified by comparing colors within the one or more images or identifying one or more edges within the one or more images. For example, the object module 230, when identifying an eyebrow, may determine a change between a skin color and a hair color (e.g., eyebrow hair color) depicted within the one or more images.

The object module 230 may identify distinct portions forming a single object. Although the object may have any number of portions, to avoid confusion, an embodiment will be discussed where the object of interest has a first portion and a second portion. For example, where the object module 230 includes facial tracking logic, the object module 230 may identify two eyebrows on a face depicted within the video stream. The object module 230, identifying the two eyebrows, may segment the each of the eyebrows into the first portion and the second portion. Here, the first portion and the second portion of each eyebrow may intersect at an arch (e.g., a bend, curve, or change in direction) of the individual eyebrow.

Figure 4:
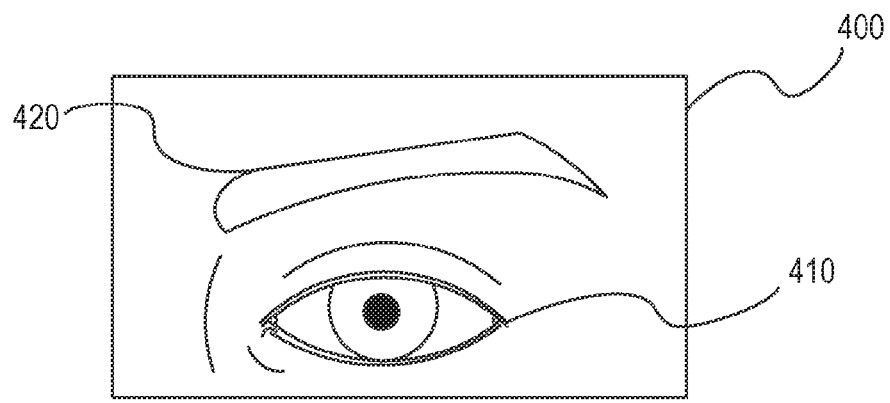
FIG. 4 illustrates a region of interest within one or more images of a video stream, according to some example embodiments.

In operation 330, the location module 220 detects one or more regions of interest containing the one or more objects of interest identified by the object module 230. The location module 220 may determine the one or more regions of interest based on the one or more objects of interest. In response to identifying the one or more regions of interest, the location module 220 crops the one or more images of the video stream to discard the portions of the image outside of the region of interest. For example, a region of interest 400 detected by the location module 220 is represented in FIG. 4 as depicting an eye 410 and an eyebrow 420.

The one or more regions of interest may be a single region of interest in which one or more object of interest is depicted. In some instances, the one or more regions of interest are a plurality of regions of interest. Each region of interest of the plurality of regions of interest may depict one or more objects of interest. For example, where the location module 220 detects two eyebrows on a face depicted within the video stream, the location module 220 may determine two regions of interest where each region of interest contains an eyebrow.

In some instances, the size and orientation of a region of interest may be determined by the object of interest depicted within the region of interest, as described above. In some instances, the location module 220 determines one or more points on the object of interest, marking a perimeter for the object of interest. The location module 220 may then generate a region of interest including the one or more points. In some instances, the location module 220 performs a region expansion to determine a size of the one or more regions of interest. For example, where the object of interest is an eyebrow, the location module 220 or the object module 230 may determine a left most point (e.g., a pixel or a pixel column) and a right most point (e.g., a pixel or pixel column) of the eyebrow to determine an approximate width of the eyebrow. The location module 220 may then determine a size of the region of interest as the approximate width of the eyebrow added to a predetermined constant. The location module 220 may also determine the size of the region of interest as the approximate width of the eyebrow (e.g., the object of interest) multiplied by a predetermined constant, such as a constant between 1.1 and 1.5, enabling expansion of the region of interest indifferent to the size of the image.

In some embodiments, the one or more regions of interest are rectangular in shape, and sized to encompass one or more objects of interest. In some embodiments, where the object of interest is of a predetermined object type, the location module 220 may select the proportions or shape of the region of interest from a predetermined set of proportions or shapes associated with the predetermined object type. The location module 220 may then size the region of interest to encompass the object of interest. For example, where the object of interest is an eyebrow depicted within the video stream, the region of interest may encompass the eyebrow and a portion of the face surrounding the eyebrow.

Figure 5:
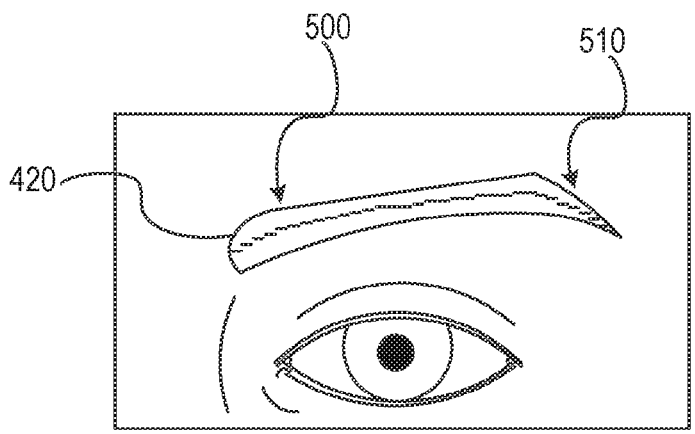
FIG. 5 illustrates a first set of median pixels and a second set of median pixels identified within one or more images of a video stream, according to some example embodiments.

In operation 340, the measure module 240 identifies a first set of median pixels of the first portion of the object of interest and identifies a second set of median pixels of the second portion of the object of interest. The region of interest may be understood to be a matrix of pixel columns and pixel rows where the object of interest is depicted by a set of pixel values traversing one or more pixel columns and one or more pixel rows. For example, as shown in FIG. 5, the first set of median pixels 500 is represented by a set of individual line segments or dots in a first portion of the eyebrow 420, and the second set of median pixels 510 is represented by a set of individual line segments or dots in a second portion of the eyebrow 420.

In some embodiments, to identify the median pixels, the measure module 240 identifies an upper bound of the object of interest and a lower bound of the object of interest. The upper and lower bounds of the object of interest may be oriented based on the proportions of the region of interest in which the object of interest is depicted. The upper and lower bounds are determined for each column of pixels having pixels depicting a portion of the object of interest. The measure module 240 may determine a median pixel for each pixel column by determining a pixel within each column of pixels which is between the upper bound and the lower bound determined for the object of interest in that pixel column. In some instances the median pixel for a pixel column may be a pixel in a pixel row which is within the column and equidistant from the both the upper bound and the lower bound.

Figure 6:
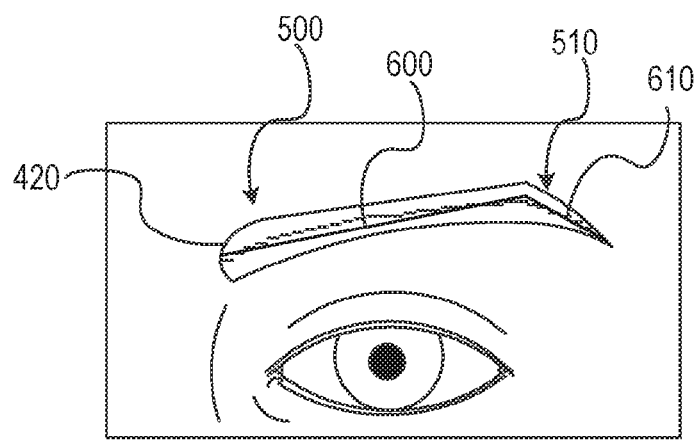
FIG. 6 illustrates a polyline approximating the first set of median pixels and the second set of median pixels depicted in FIG. 5, according to some embodiments.

In operation 350, the approximation module 250 determines a polyline approximating the first portion and the second portion of the object of interest. In some embodiments, the approximation module 250 determines a first link of the polyline extending along one or more of the first set of median pixels of the first portion and a second link of the polyline extending along one or more of the second set of median pixels of the second portion. For example, as represented in FIG. 6, the first link 600 of the polyline may be positioned along the first set of median pixels 500 and the second link 610 of the polyline may be positioned along the second set of median pixels 510.

In determining the first link of the polyline, the approximation module 250 identifies a first end and a second end for the first portion of the object of interest. The first end and the second end are opposite one another along a length of the first portion of the object of interest. In some embodiments, the first end is a first median pixel of the set of median pixels proximate to one end of the first portion and the second end is a second median pixel of the set of median pixels proximate to another end of the first portion. The approximation module may fit the first link of the polyline as a line extending between the first median pixel and the second median pixel. In some instances, the approximation module 250 fits the first link of the polyline to a plurality of median pixels of the set of median pixels extending between the first median pixel and the second median pixel. In these embodiments, the approximation module 250 determines the first link by minimizing the average of the squares of the distance between the first link and a median pixel of the first set of median pixels in each pixel column. In various example embodiments, the approximation module 250 generates the second link of the polyline using the second set of median pixels in the same or similar manner as the operations used to generate the first link of the polyline.

Although described as determining a two link polyline to approximate the first portion and the second portion of the object of interest, it will be understood that the polyline may include more than two links, based on the number of portions into which the object of interest is subdivided. Further, although described as using a polyline, it will be understood that the approximation module 250 may approximate the object of interest, and any included portions, using object modeling operations which do not use polylines.

In operation 360, the model module 260 generates a model for the polyline. In some embodiments, the model module 260 generates the model by computing a first length of the first link, a second length of the second link, an angle extending between the first link and the second link, and a slope angle for the first link. The model module 260 may generate the first length as a first number of pixels extending between the first end and the second end of the first link. The model module 260 may generate the second length as a second number of pixels extending between a first end and a second end of the second link. The model module 260 may calculate the slope of the first link based on the pixel columns and pixel rows crossed by the first link. The model module 260 may determine the angle between the first link and the second link by calculating the slope of the second link, similarly to the slope of the first link. The model module 260 may then compare the slope of the first link to the slope of the second link to generate the angle. In some embodiments, the model module 260 determines the angle by calculating a first vector for the first link and a second vector for the second link. The model module 260 then determines the angle extending between the first vector and the second vector.

In example embodiments, where the method 300 is performed on a plurality of images within the video stream, the operation 360 generates an averaged model based on a model generated for each image of the plurality of images of the video stream. In some instances, where the method 300 identifies two or more regions of interest, the method 300 is performed on each of the two or more regions of interest. The model module 260 may generate the model which includes the objects of interest from each of the two or more regions of interest. For example, where the method 300 is generating a model of eyebrows depicted on a face within the video stream, the operations 320-350 on two regions of interest, each containing an eyebrow as an object of interest. The operation 360 is then performed such that the model module 260 generates a model for both of the eyebrows, within the same model. In these embodiments, the model module 260 computes a first length of the first link, a second length of the second link, an angle extending between the first link and the second link, and a slope angle for the first link for each eyebrow.

Figure 7:
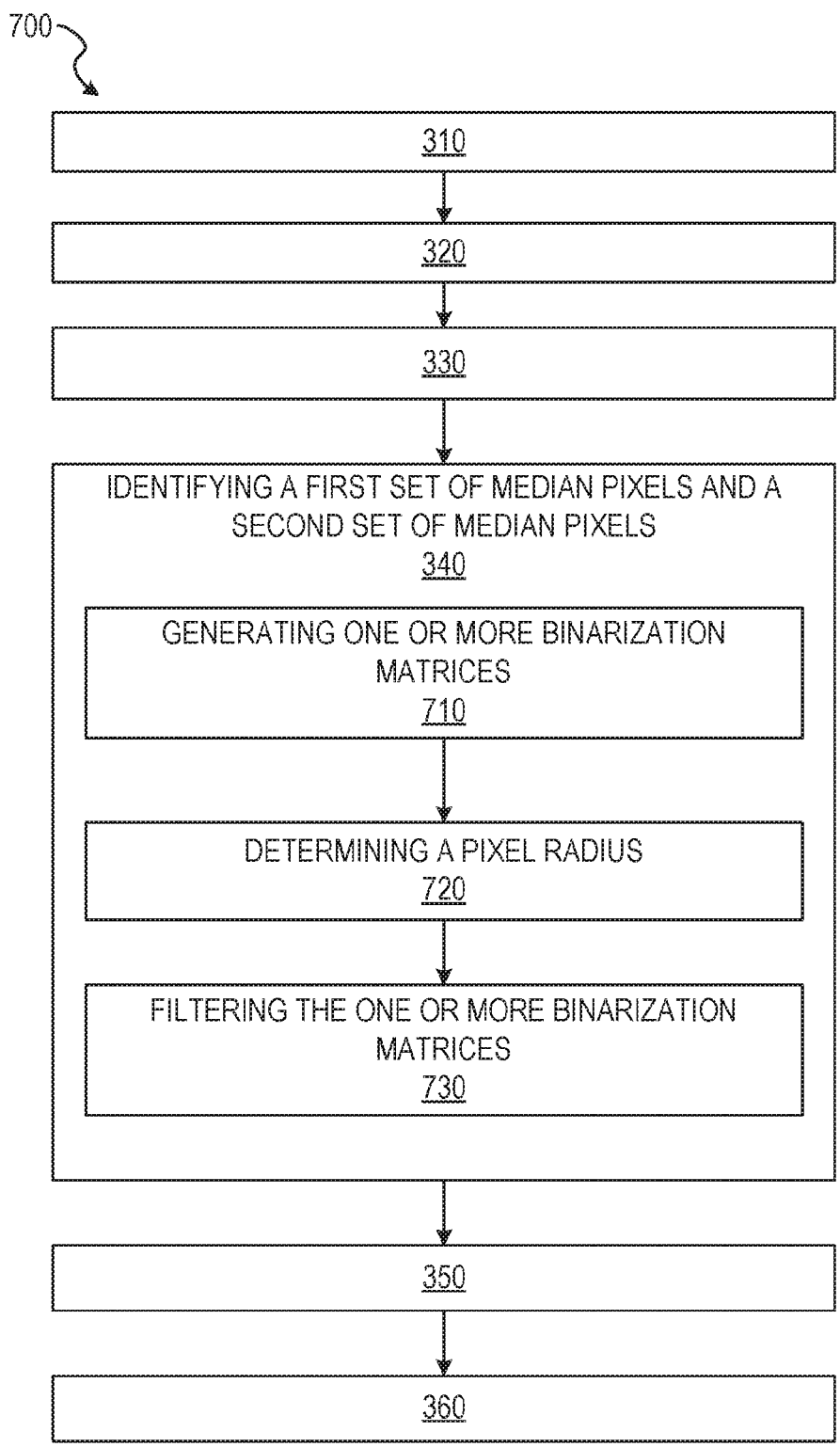
FIG. 7 is a flow diagram illustrating an example method for segmenting images within a video stream to model an object of interest based on the segmentation, according to some example embodiments.

FIG. 7 shows a flow diagram illustrating an example method 700 for segmenting portions of a video stream and modifying one or more segmented portions of the video stream. The operations of method 700 may be performed by components of the modeling system 160. In some instances, certain operations of the method 700 may be performed using one or more operations of the method 300 or as sub-operations of one or more operations of the method 300, as will be explained in more detail below.

In some embodiments, the operation 340 comprises one or more sub-operations. As shown in FIG. 7, in operation 710, the binarization module 270 generates one or more binarization matrices from the one or more images. In some embodiments, the binarization module 270 generates a binarization matrix for each image of the one or more images accessed in the operation 310 or the region of interest of the one or more images detected in the operation 320. The binarization matrix may be a matrix of values of intersections between "i" and "j," where "i" is an index of pixel rows and "j" is an index of pixel columns. In some embodiments, an intersection in the binarization matrix representing a portion of the object of interest (e.g., an eyebrow) has a value of one and an intersection having a value of zero represents a portion of the image or region of interest outside the object of interest.

In some embodiments the binarization matrix is generated by performing one or more binarization operations on an image of the one or more images. To generate the binarization matrix, the binarization module 270 may convert an image to a single channel image, generate an approximation image from the single channel image, and binarize the image by comparing individual pixel values within the approximation image to a predetermined threshold. Where a pixel value exceeds the threshold, the pixel value may be modified to a first value. Where the threshold exceeds a pixel value, the pixel value may be modified to a second value. In some instances, the first value is one, indicating a white pixel, and the second value is zero, indicating a black pixel. Although the present disclosure describes a method of generating the binarization matrix, it should be understood that the binarization matrix may be generated by any suitable set of binarization operations.

In operation 720, the measure module 240 determines a pixel radius. In some embodiments, the pixel radius is a predefined pixel radius. For example, the pixel radius may be a three pixel by three pixel square or rectangle surrounding a specified pixel. In some instances, the pixel radius may be defined by one or more of the object of interest or the region of interest. Where the pixel radius is defined by the object of interest, the pixel radius may be selected from a predetermined set of pixel radii. For example, the size of the pixel radius may be a function of a size of the object of interest. Where the pixel radius is defined by the region of interest, the pixel radius may be selected from a predetermined set of pixel radii. For example, a size, shape, or proportion of the region of interest may be associated with a predetermined pixel radii, where differing proportions, differing shapes, or differing sizes are associated with differing predetermined pixel radii.

In operation 730, the binarization module 270 filters the one or more binarization matrices to remove noise from the binary images represented by the binarization matrices. In some instances, the binarization module 270 filters the binarization matrices by exchanging a first pixel value for a second pixel value where a pixel associated with the first pixel value is proximate to a set of pixels of the second pixel value, based on the pixel radius. The binarization module 270 may traverse the binarization matrices filtering each pixel (e.g., intersection of the binarization matrices). The binarization module 270 may exchange pixel values where a predetermined number of pixels within the pixel radius share a value. In some embodiments, to exchange the first pixel value for the second pixel value, binarization module 270 determines that the predetermined number of pixels having the same value are adjacent.

After filtering the one or more binarization matrices in the operation 730, the measure module 240 may identify the first set of median pixels for the first portion and the second set of median pixels of the second portion of the object of interest, as described above with respect to the operation 340. The method 700 may further be performed by the operations 350 and 360.

Figure 8:
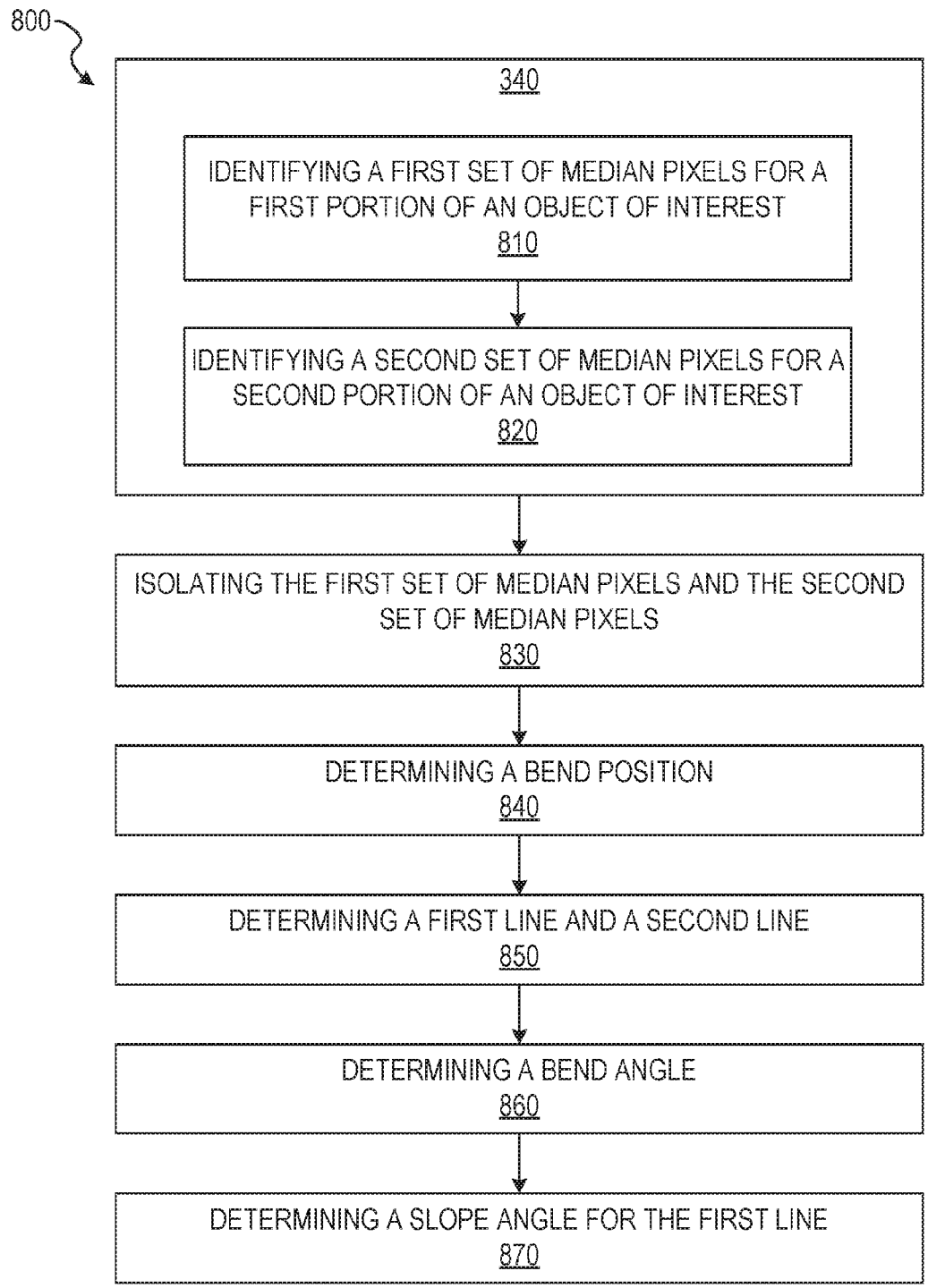
FIG. 8 is a flow diagram illustrating an example method for segmenting images within a video stream to model an object of interest based on the segmentation, according to some example embodiments.

FIG. 8 shows a flow diagram illustrating an example method 800 for segmenting portions of a video stream and modifying one or more segmented portions of the video stream. The operations of method 800 may be performed by components of the modeling system 160. In some instances, certain operations of the method 800 may be performed using one or more operations of the methods 300 and 700 or as sub-operations of one or more operations of the methods 300 and 700, as will be explained in more detail below.

The method 800 may be performed initially by the operations 310, 320, 330, 710, 720, and 730. As part of the operation 340, the measure module 240, in operation 810, identifies a first set of median pixels for the first portion of the object of interest. In some embodiments, the operation 810 may be performed similarly to the operations described above in FIG. 3. The first set of median pixels are median pixels in each pixel column of the region of interest associated with the first portion of the object of interest.

In some embodiments, the measure module 240 identifies an upper bound of the object of interest and a lower bound of the object of interest within each pixel column, having a pixel associated with the first portion of the object of interest. The measure module 240 may parse each column of the binarization matrices to identify the upper bound and the lower bound of the object of interest. The upper bound may be the first pixel (e.g., intersection of a binary matrix) within a pixel column which retains the first value after the binarization matrix has been filtered in the operation 730. The lower bound may be the last pixel within the pixel column which retains the first value after the binarization matrix has been filtered in the operation 730. Once the measure module 240 has identified the upper bound and the lower bound within a given pixel column, the measure module 240 may identify the median pixel between the upper bound and the lower bound, as described above with respect to FIG. 3. The measure module 240 may identify the median pixel for each column having one or more pixel (e.g., intersection) representing the first portion of the object of interest. The median pixel, identified in the operation 810, in any given pixel column is a median pixel of the first set of median pixels.

In operation 820, the measure module 240 identifies a second set of median pixels for the second portion of the object of interest. The second set of median pixels are a median pixel in each column, of the one or more binarization matrices, having a pixel associated with the second portion of the object of interest. The operation 820 may be performed similarly or the same as the operation 810, identifying upper and lower bounds of pixels in each column representing the second portion of the object of interest and identifying the median pixel in each column positioned between the upper and lower bounds.

In operation 830, the measure module 240 isolates the first set of median pixels and the second set of median pixels within the one or more binarization matrices from the remaining pixels. In some embodiments, the measure module 240 isolates the first set of median pixels and the second set of median pixels by removing pixels (e.g., intersections) from the binarization matrices which have not been identified within the first set of median pixels or the second set of median pixels.

In operation 840, the approximation module 250 determines a bend position between the first portion and the second portion of the object of interest. In some embodiments, the operation 840 is performed as a sub-operation of the operation 350. In the operation 840, the approximation module 250 may determine the bend position as a specified pixel or pixels within one or more columns and one or more rows serving as an intersection between the first set of median pixels and the second set of median pixels. In some embodiments, the bend position is determined by comparing the pixel rows associated with the first set of median pixels and the second set of median pixels. The approximation module 250 may determine the bend position by identifying a column or columns representing an apex between the first set of median pixels and the second set of median pixels. In these embodiments, the apex is the one or more pixels of one or more of the first set of median pixels and the second set of median pixels which are positioned at the upper most pixel row based on the orientation of the region of interest.

In operation 850, the approximation module 250 determines a first line extending in a first direction from the bend position. The first line extends across one or more of the first set of median pixels. The approximation module 250 may determine a first end and a second end of the first set of median pixels. The second end may be represented by a pixel of the first set of median pixels located proximate to the bend position. Where the second end is proximate to the bend position, the first end may be represented by a pixel of the first set of median pixels located opposite the second pixel and within the first set of median pixels. The approximation module 250 may also determine a second line extending in a second direction from the bend position. The second line extends across one or more of the second set of median pixels. Similarly to the description of determining the first line above, the approximation module 250 determines a first end and a second end for the second set of median pixels.

In determining the first line and the second line, the approximation module 250 may determine, for each of the first line and the second line, an average of the squares of the distances between the median pixels and the line associated with the median pixels. For example, to fit the first line to the first set of median pixels, the approximation module 250 may use the least squares method to calculate an average of the squares of the distances between the first set of median pixels and the first line. The approximation module 250 may also calculate an average of the squares of the distances between the second set of median pixels and the second line. The approximation module 250 may determine a theoretical minimum value (e.g., a value below a predetermined threshold) for the average distances of the first line and the second line. The first line and the second line which have the smallest square (e.g., a square which falls below the predetermined threshold) may be selected as the first line and the second line.

In some instances, after determining the first line and the second line, the approximation module 250 determines a length for each of the first line and the second line. The first line may extend from the bend position to an opposing end (e.g., the first end) of the first set of median pixels. The second line may extend for the bend position to an opposing end (e.g., the first end) of the second set of median pixels. In some instances, the length of the first line (e.g., a first length) and the length of the second line (e.g., a second length) may be determined by a number of pixels or pixel columns across which the first line or the second line extends. In some instances, the first length and the second length may be determined based on a slope of the first line and the second line, respectively.

In operation 860, the approximation module 250 determines a bend angle for a bend extending between the first line and the second line. In some embodiments, the approximation module 250 determines the bend angle based on a first vector of the first line and a second vector of the second line. The vector for each of the first line and the second line may be determined based on the first end and the second end of the first line and the second line, respectively.

In some instances, the bend angle may be determined and a median line is generated which intersects the bend position determined in the operation 840. The approximation module 250 determines a height of where the first line and the second line intersect the median line. In some embodiments, the height is determined with respect to the total pixel height of the region of interest. After the height is calculated, the approximation module 250 determines a first Euclidean distance and a second Euclidean distance from an end point of the first line and an end point of the second line, respectively. The end point for each line is a pixel opposite the bend position, such as the first end of the first line and the first end of the second line.

In some embodiments, the bend angle is determined based on a comparison of a slope of the first line and a slope of the second line. An embodiment for determining the slope is described below.

In operation 870, the approximation module 250 determines a slope angle for the first line (e.g., the first portion of the object of interest or eyebrow). The slope angle may be calculated based on the angle at which the first line traverses the pixel rows and the pixel columns of the region of interest. For example, the approximation module 250 may identify the pixel rise per pixel run (e.g., a number of pixels in a vertical orientation per a number of pixels in a horizontal orientation) for the first line.

In the method 800, the operation 360 may be performed by the model module 260 identifying one or more parameters determined by the approximation module 250. In some instances, the model module 260 generates the model based on the first length of the first line, the second length of the second line, the bend angle, and the slope angle of the first line. Where the method is being performed on the set of images of the video stream, the model module 260 may generate the model as an average model, where values for the first length, the second length, the bend angle, and the slope angle of the first line are averaged across one or more images of the set of images.

Figure 9:
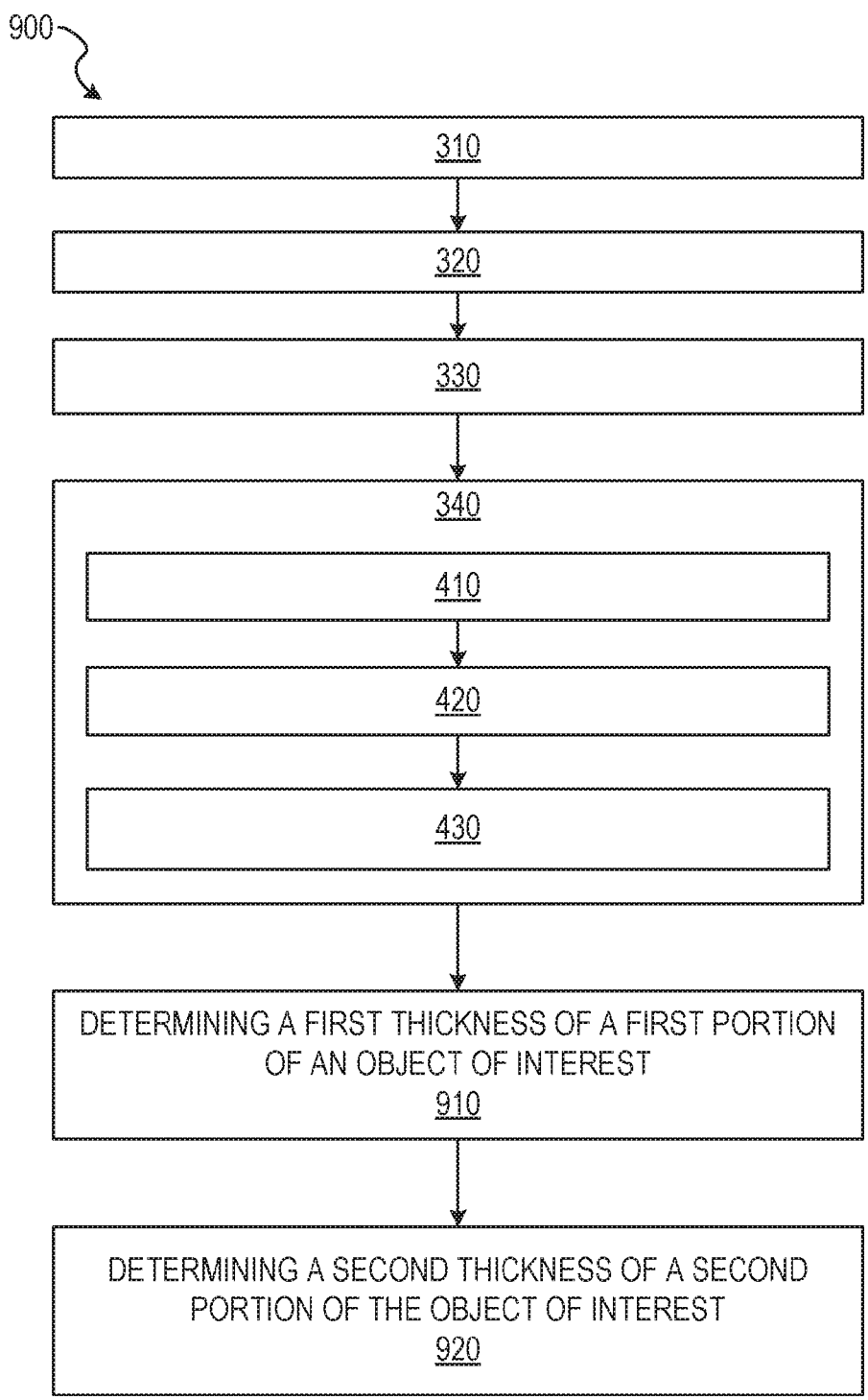
FIG. 9 is a flow diagram illustrating an example method for segmenting images within a video stream to model an object of interest based on the segmentation, according to some example embodiments.

FIG. 9 depicts a flow diagram illustrating an example method 900 of tracking and modifying the object of interest in a video stream using the modeling system 160. The operations of method 900 may be performed by components of the modeling system 160. In some instances, certain operations of the method 900 may be performed using one or more operations of the methods 300 or 800, in one or more of the described embodiments, or as sub-operations of one or more operations of the methods 300 or 800, as will be explained in more detail below.

In some embodiments, the method 900 is initiated by performing the operations 310, 320, and 330 of the method 300 and the operations 710, 720, and 730 of the method 700. In operation 910, the measure module 240 determines a first thickness of the first portion of the object of interest. The first thickness may be determined based on an average thickness of the first portion of the object of interest. In some instances, the measure module 240 determines the first thickness based on the upper bound and the lower bound of each pixel column depicting a part of the first portion of the object of interest. Where the first thickness is an average thickness, the measure module 240 may determine a column difference between the upper bound and the lower bound of each pixel column. The measure module 240 may then average the column differences for the first portion of the object of interest. In some instances, where the object of interest is tilted with respect to the region of interest, the measure module 240 may determine a vertical line perpendicular to the first line and calculate the thickness of the first portion based on the perpendicular vertical line.

In operation 920, the measure module 240 determines a second thickness of the second portion of the object of interest. The second thickness may be determined based on an average thickness of the second portion of the object of interest. Similar to the description of the operation 910, the measure module 240 may determine the thickness of the second portion or the average thickness of the second portion based on the upper bound and the lower bound determined for each column depicting pixels within the second portion of the object of interest.

In some embodiments, after determining the first thickness and the second thickness, the method 900 is further performed by operations 340-360. In the operation 360, in some instances, the model module 260 generates the model for the object of interest based on parameters identified by the approximation module 250. In some instances, the model module 260 generates the model based on the first length of the first line, the second length of the second line, the bend angle, the slope angle of the first line, the first thickness of the first line, and the second thickness of the second line. Where the method is being performed on the set of images of the video stream, the model module 260 may generate the model as an average model, where values for the first length, the second length, the bend angle, the slope angle of the first line, the first thickness, and the second thickness are averaged across one or more images of the set of images Modules, Components, and Logic Certain embodiments are described herein as including logic or a number of components, modules, or mechanisms. Modules can constitute hardware modules. A "hardware module" is a tangible unit capable of performing certain operations and can be configured or arranged in a certain physical manner. In various example embodiments, computer systems (e.g., a standalone computer system, a client computer system, or a server computer system) or hardware modules of a computer system (e.g., at least one hardware processor, a processor, or a group of processors) is configured by software (e.g., an application or application portion) as a hardware module that operates to perform certain operations as described herein.

In some embodiments, a hardware module is implemented mechanically, electronically, or any suitable combination thereof. For example, a hardware module can include dedicated circuitry or logic that is permanently configured to perform certain operations. For example, a hardware module can be a special-purpose processor, such as a Field-Programmable Gate Array (FPGA) or an Application Specific Integrated Circuit (ASIC). A hardware module may also include programmable logic or circuitry that is temporarily configured by software to perform certain operations. For example, a hardware module can include software encompassed within a general-purpose processor or other programmable processor. It will be appreciated that the decision to implement a hardware module mechanically, in dedicated and permanently configured circuitry, or in temporarily configured circuitry (e.g., configured by software) can be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software can accordingly configure a particular processor or processors, for example, to constitute a particular hardware module at one instance of time and to constitute a different hardware module at a different instance of time.

Hardware modules can provide information to, and receive information from, other hardware modules. Accordingly, the described hardware modules can be regarded as being communicatively coupled. Where multiple hardware modules exist contemporaneously, communications can be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module performs an operation and stores the output of that operation in a memory device to which it is communicatively coupled. A further hardware module can then, at a later time, access the memory device to retrieve and process the stored output. Hardware modules can also initiate communications with input or output devices, and can operate on a resource (e.g., a collection of information).

The various operations of example methods described herein can be performed, at least partially, by processors that are temporarily configured (e.g., by software) or permanently configured to perform the relevant operations. Whether temporarily or permanently configured, such processors constitute processor-implemented modules that operate to perform operations or functions described herein. As used herein, "processor-implemented module" refers to a hardware module implemented using processors.

Similarly, the methods described herein can be at least partially processor-implemented, with a particular processor or processors being an example of hardware. For example, at least some of the operations of a method can be performed by processors or processor-implemented modules. Moreover, the processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via appropriate interfaces (e.g., an Application Program Interface (API)).

The performance of certain of the operations may be distributed among the processors, not only residing within a single machine, but deployed across a number of machines. In some example embodiments, the processors or processor-implemented modules are located in a single geographic location (e.g., within a home environment, an office environment, or a server farm). In other example embodiments, the processors or processor-implemented modules are distributed across a number of geographic locations.

Applications

Figure 10:
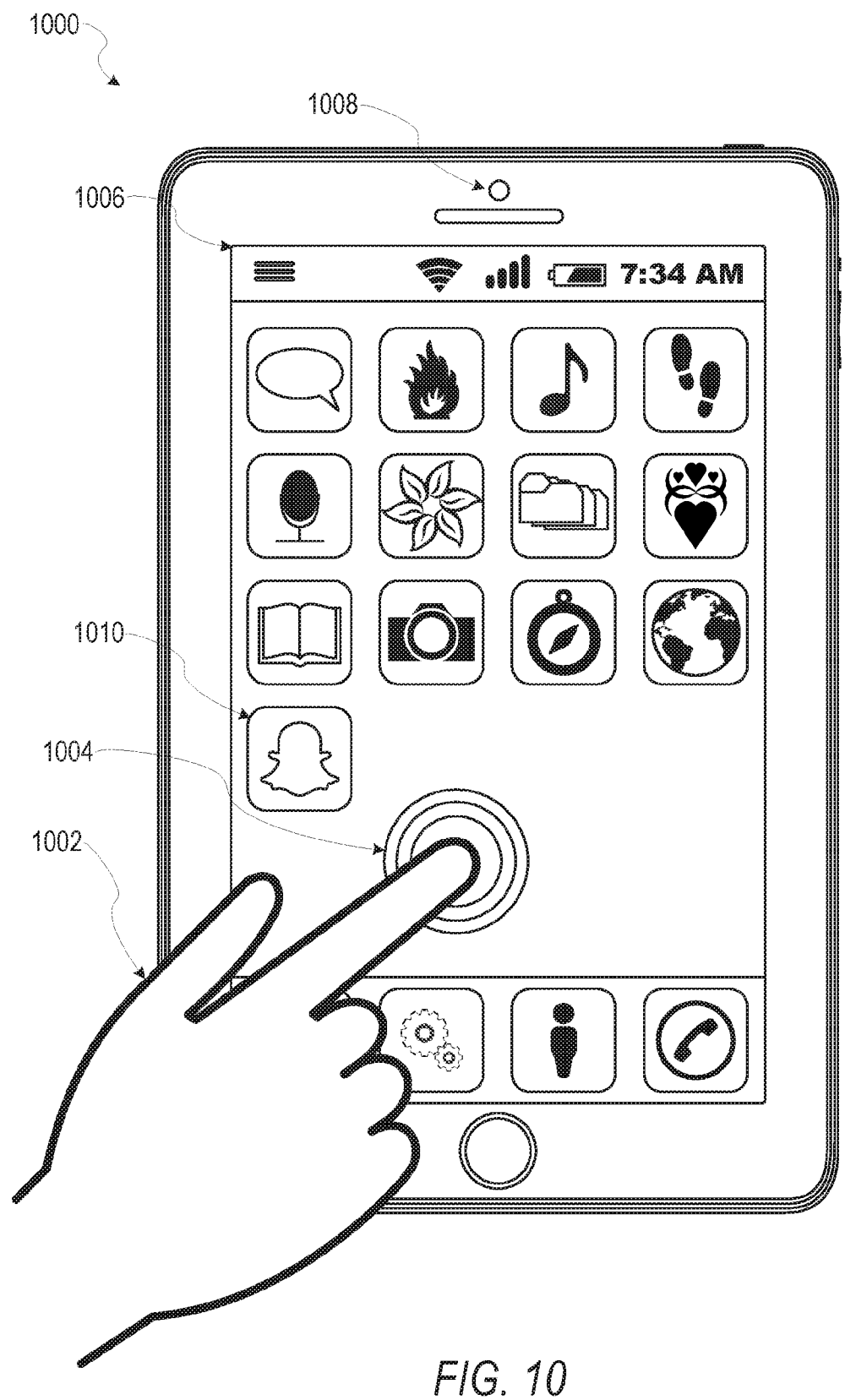
FIG. 10 is a user interface diagram depicting an example mobile device and mobile operating system interface, according to some example embodiments.

FIG. 10 illustrates an example mobile device 1000 executing a mobile operating system (e.g., IOS™, ANDROID™, WINDOWS® Phone, or other mobile operating systems), consistent with some embodiments. In one embodiment, the mobile device 1000 includes a touch screen operable to receive tactile data from a user 1002. For instance, the user 1002 may physically touch 1004 the mobile device 1000, and in response to the touch 1004, the mobile device 1000 may determine tactile data such as touch location, touch force, or gesture motion. In various example embodiments, the mobile device 1000 displays a home screen 1006 (e.g., Springboard on IOS™) operable to launch applications or otherwise manage various aspects of the mobile device 1000. In some example embodiments, the home screen 1006 provides status information such as battery life, connectivity, or other hardware statuses. The user 1002 can activate user interface elements by touching an area occupied by a respective user interface element. In this manner, the user 1002 interacts with the applications of the mobile device 1000. For example, touching the area occupied by a particular icon included in the home screen 1006 causes launching of an application corresponding to the particular icon.

The mobile device 1000, as shown in FIG. 10, includes an imaging device 1008. The imaging device may be a camera or any other device coupled to the mobile device 1000 capable of capturing a video stream or one or more successive images. The imaging device 1008 may be triggered by the modeling system 160 or a selectable user interface element to initiate capture of a video stream or succession of images and pass the video stream or succession of images to the modeling system for processing according to the one or more methods described in the present disclosure.

Many varieties of applications (also referred to as "apps") can be executing on the mobile device 1000, such as native applications (e.g., applications programmed in Objective-C, Swift, or another suitable language running on IOS™, or applications programmed in Java running on ANDROID™), mobile web applications (e.g., applications written in Hypertext Markup Language-5 (HTML5)), or hybrid applications (e.g., a native shell application that launches an HTML5 session). For example, the mobile device 1000 includes a messaging app, an audio recording app, a camera app, a book reader app, a media app, a fitness app, a file management app, a location app, a browser app, a settings app, a contacts app, a telephone call app, or other apps (e.g., gaming apps, social networking apps, biometric monitoring apps). In another example, the mobile device 1000 includes a social messaging app 1010 such as SNAPCHAT® that, consistent with some embodiments, allows users to exchange ephemeral messages that include media content. In this example, the social messaging app 1010 can incorporate aspects of embodiments described herein. For example, in some embodiments the social messaging application includes an ephemeral gallery of media created by users the social messaging application. These galleries may consist of videos or pictures posted by a user and made viewable by contacts (e.g., "friends") of the user. Alternatively, public galleries may be created by administrators of the social messaging application consisting of media from any users of the application (and accessible by all users). In yet another embodiment, the social messaging application may include a "magazine" feature which consists of articles and other content generated by publishers on the social messaging application's platform and accessible by any users. Any of these environments or platforms may be used to implement concepts of the present invention.

In some embodiments, an ephemeral message system may include messages having ephemeral video clips or images which are deleted following a deletion trigger event such as a viewing time or viewing completion. In such embodiments, a device implementing the modeling system 160 may identify, track, and modify an object of interest within the ephemeral video clip, as the ephemeral video clip is being captured by the device and transmit the ephemeral video clip to another device using the ephemeral message system.

Software Architecture

Figure 11:
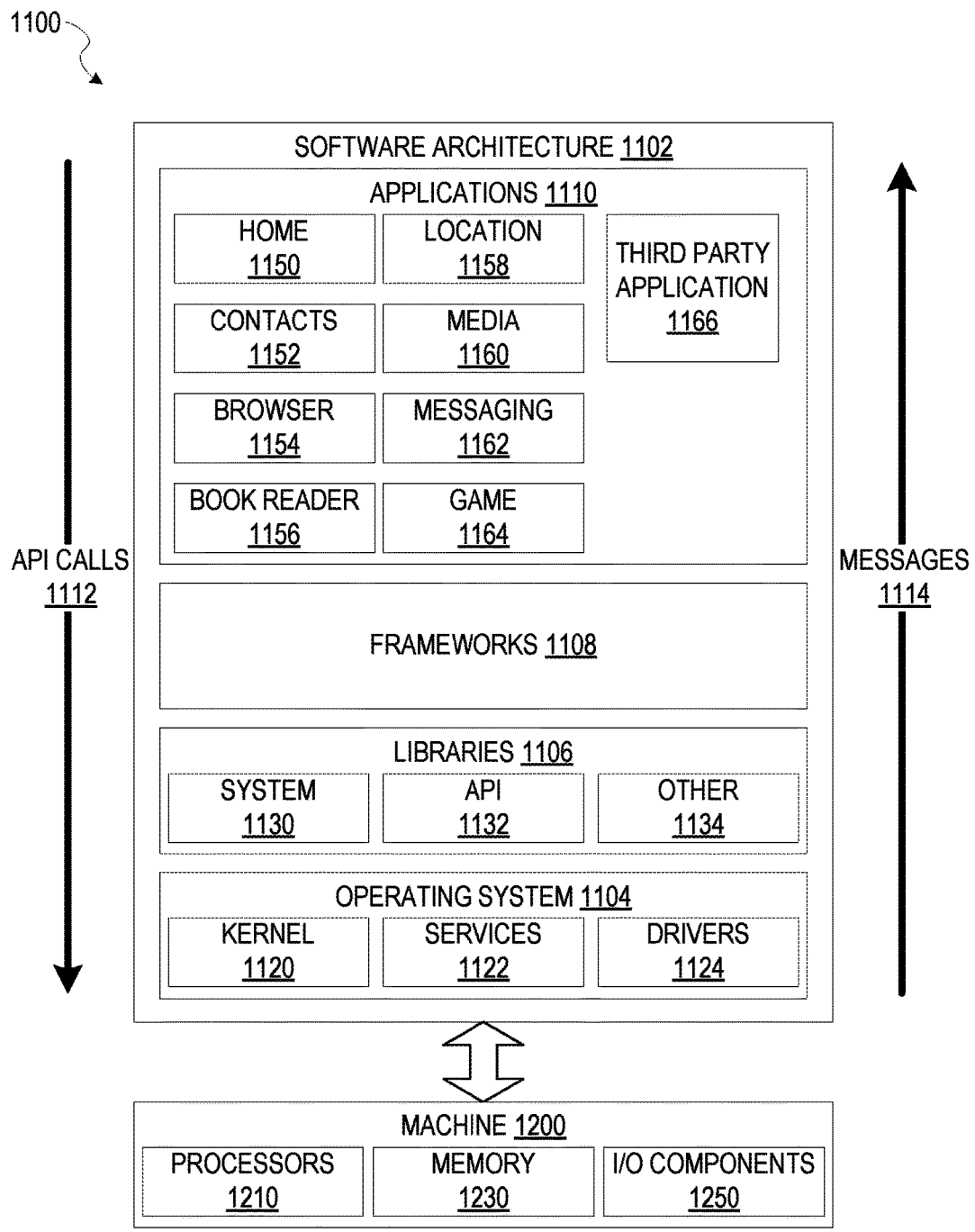
FIG. 11 is a block diagram illustrating an example of a software architecture that may be installed on a machine, according to some example embodiments.

FIG. 11 is a block diagram 1100 illustrating an architecture of software 1102, which can be installed on the devices described above. FIG. 11 is merely a non-limiting example of a software architecture, and it will be appreciated that many other architectures can be implemented to facilitate the functionality described herein. In various embodiments, the software 1102 is implemented by hardware such as machine a 1200 of FIG. 12 that includes processors 1210, memory 1230, and I/O components 1250. In this example architecture, the software 1102 can be conceptualized as a stack of layers where each layer may provide a particular functionality. For example, the software 1102 includes layers such as an operating system 1104, libraries 1106, frameworks 1108, and applications 1110. Operationally, the applications 1110 invoke application programming interface (API) calls 1112 through the software stack and receive messages 1114 in response to the API calls 1112, consistent with some embodiments.

In various implementations, the operating system 1104 manages hardware resources and provides common services. The operating system 1104 includes, for example, a kernel 1120, services 1122, and drivers 1124. The kernel 1120 acts as an abstraction layer between the hardware and the other software layers consistent with some embodiments. For example, the kernel 1120 provides memory management, processor management (e.g., scheduling), component management, networking, and security settings, among other functionality. The services 1122 can provide other common services for the other software layers. The drivers 1124 are responsible for controlling or interfacing with the underlying hardware, according to some embodiments. For instance, the drivers 1124 can include display drivers, camera drivers, BLUETOOTH® drivers, flash memory drivers, serial communication drivers (e.g., Universal Serial Bus (USB) drivers), WI-FI® drivers, audio drivers, power management drivers, and so forth.

In some embodiments, the libraries 1106 provide a low-level common infrastructure utilized by the applications 1110. The libraries 1106 can include system libraries 1130 (e.g., C standard library) that can provide functions such as memory allocation functions, string manipulation functions, mathematic functions, and the like. In addition, the libraries 1106 can include API libraries 1132 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 1106 can also include a wide variety of other libraries 1134 to provide many other APIs to the applications 1110.

The frameworks 1108 provide a high-level common infrastructure that can be utilized by the applications 1110, according to some embodiments. For example, the frameworks 1108 provide various graphic user interface (GUI) functions, high-level resource management, high-level location services, and so forth. The frameworks 1108 can provide a broad spectrum of other APIs that can be utilized by the applications 1110, some of which may be specific to a particular operating system or platform.

In an example embodiment, the applications 1110 include a home application 1150, a contacts application 1152, a browser application 1154, a book reader application 1156, a location application 1158, a media application 1160, a messaging application 1162, a game application 1164, and a broad assortment of other applications such as a third party application 1166. According to some embodiments, the applications 1110 are programs that execute functions defined in the programs. Various programming languages can be employed to create the applications 1110, structured in a variety of manners, such as object-oriented programming languages (e.g., Objective-C, Java, or C++) or procedural programming languages (e.g., C or assembly language). In a specific example, the third party application 1166 (e.g., an application developed using the ANDROID™ or IOS™ software development kit (SDK) by an entity other than the vendor of the particular platform) may be mobile software running on a mobile operating system such as IOS™, ANDROID™, WINDOWS® PHONE, or another mobile operating systems. In this example, the third party application 1166 can invoke the API calls 1112 provided by the operating system 1104 to facilitate functionality described herein.

Example Machine Architecture and Machine-Readable Medium

Figure 12:
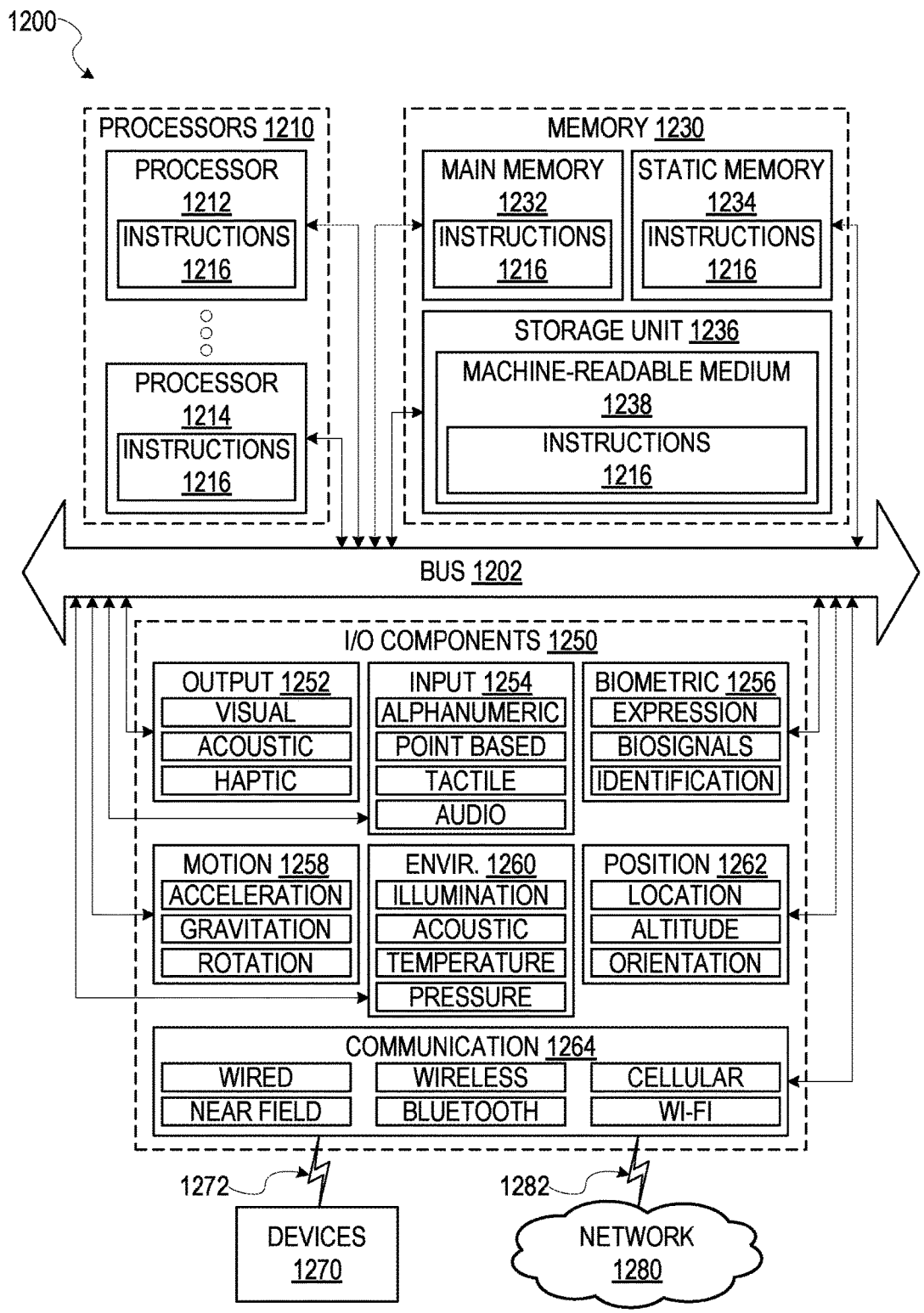
FIG. 12 is a block diagram presenting a diagrammatic representation of a machine in the form of a computer system within which a set of instructions may be executed for causing the machine to perform any of the methodologies discussed herein, according to an example embodiment.

FIG. 12 is a block diagram illustrating components of a machine 1200, according to some embodiments, able to read instructions (e.g., processor executable instructions) from a machine-readable medium (e.g., a non-transitory processor-readable storage medium) and perform any of the methodologies discussed herein. Specifically, FIG. 12 shows a diagrammatic representation of the machine 1200 in the example form of a computer system, within which instructions 1216 (e.g., software, a program, an application, an applet, an app, or other executable code) for causing the machine 1200 to perform any of the methodologies discussed herein can be executed. In alternative embodiments, the machine 1200 operates as a standalone device or can be coupled (e.g., networked) to other machines. In a networked deployment, the machine 1200 may operate in the capacity of a server machine or a client machine in a server-client network environment, or as a peer machine in a peer-to-peer (or distributed) network environment. The machine 1200 can comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1216, sequentially or otherwise, that specify actions to be taken by the machine 1200. Further, while only a single machine 1200 is illustrated, the term "machine" shall also be taken to include a collection of machines 1200 that individually or jointly execute the instructions 1216 to perform any of the methodologies discussed herein.

In various embodiments, the machine 1200 comprises processors 1210, memory 1230, and I/O components 1250, which can be configured to communicate with each other via a bus 1202. In an example embodiment, the processors 1210 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) includes, for example, a processor 1212 and a processor 1214 that may execute the instructions 1216. The term "processor" is intended to include multi-core processors that may comprise two or more independent processors (also referred to as "cores") that can execute instructions contemporaneously. Although FIG. 12 shows multiple processors, the machine 1200 may include a single processor with a single core, a single processor with multiple cores (e.g., a multi-core processor), multiple processors with a single core, multiple processors with multiples cores, or any combination thereof.

The memory 1230 comprises a main memory 1232, a static memory 1234, and a storage unit 1236 accessible to the processors 1210 via the bus 1202, according to some embodiments. The storage unit 1236 can include a machine-readable medium 1238 on which are stored the instructions 1216 embodying any of the methodologies or functions described herein. The instructions 1216 can also reside, completely or at least partially, within the main memory 1232, within the static memory 1234, within at least one of the processors 1210 (e.g., within the processor's cache memory), or any suitable combination thereof, during execution thereof by the machine 1200. Accordingly, in various embodiments, the main memory 1232, the static memory 1234, and the processors 1210 are considered machine-readable media 1238.

As used herein, the term "memory" refers to a machine-readable medium 1238 able to store data temporarily or permanently and may be taken to include, but not be limited to, random-access memory (RAM), read-only memory (ROM), buffer memory, flash memory, and cache memory. While the machine-readable medium 1238 is shown in an example embodiment to be a single medium, the term "machine-readable medium" should be taken to include a single medium or multiple media (e.g., a centralized or distributed database, or associated caches and servers) able to store the instructions 1216. The term "machine-readable medium" shall also be taken to include any medium, or combination of multiple media, that is capable of storing instructions (e.g., instructions 1216) for execution by a machine (e.g., machine 1200), such that the instructions, when executed by processors of the machine 1200 (e.g., processors 1210), cause the machine 1200 to perform any of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, data repositories in the form of a solid-state memory (e.g., flash memory), an optical medium, a magnetic medium, other non-volatile memory (e.g., Erasable Programmable Read-Only Memory (EPROM)), or any suitable combination thereof. The term "machine-readable medium" specifically excludes non-statutory signals per se.

The I/O components 1250 include a wide variety of components to receive input, provide output, produce output, transmit information, exchange information, capture measurements, and so on. In general, it will be appreciated that the I/O components 1250 can include many other components that are not shown in FIG. 12. The I/O components 1250 are grouped according to functionality merely for simplifying the following discussion, and the grouping is in no way limiting. In various example embodiments, the I/O components 1250 include output components 1252 and input components 1254. The output components 1252 include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor), other signal generators, and so forth. The input components 1254 include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

In some further example embodiments, the I/O components 1250 include biometric components 1256, motion components 1258, environmental components 1260, or position components 1262, among a wide array of other components. For example, the biometric components 1256 include components to detect expressions (e.g., hand expressions, facial expressions, vocal expressions, body gestures, or mouth gestures), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1258 include acceleration sensor components (e.g., accelerometer), gravitation sensor components, rotation sensor components (e.g., gyroscope), and so forth. The environmental components 1260 include, for example, illumination sensor components (e.g., photometer), temperature sensor components (e.g., thermometers that detect ambient temperature), humidity sensor components, pressure sensor components (e.g., barometer), acoustic sensor components (e.g., microphones that detect background noise), proximity sensor components (e.g., infrared sensors that detect nearby objects), gas sensor components (e.g., machine olfaction detection sensors, gas detection sensors to detect concentrations of hazardous gases for safety or to measure pollutants in the atmosphere), or other components that may provide indications, measurements, or signals corresponding to a surrounding physical environment. The position components 1262 include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication can be implemented using a wide variety of technologies. The I/O components 1250 may include communication components 1264 operable to couple the machine 1200 to a network 1280 or devices 1270 via a coupling 1282 and a coupling 1272, respectively. For example, the communication components 1264 include a network interface component or another suitable device to interface with the network 1280. In further examples, communication components 1264 include wired communication components, wireless communication components, cellular communication components, Near Field Communication (NFC) components, BLUETOOTH® components (e.g., BLUETOOTH® Low Energy), WI-FI® components, and other communication components to provide communication via other modalities. The devices 1270 may be another machine or any of a wide variety of peripheral devices (e.g., a peripheral device coupled via a Universal Serial Bus (USB)).

Moreover, in some embodiments, the communication components 1264 detect identifiers or include components operable to detect identifiers. For example, the communication components 1264 include Radio Frequency Identification (RFID) tag reader components, NFC smart tag detection components, optical reader components (e.g., an optical sensor to detect a one-dimensional bar codes such as a Universal Product Code (UPC) bar code, multi-dimensional bar codes such as a Quick Response (QR) code, Aztec Code, Data Matrix, Dataglyph, MaxiCode, PDF417, Ultra Code, Uniform Commercial Code Reduced Space Symbology (UCC RSS)-2D bar codes, and other optical codes), acoustic detection components (e.g., microphones to identify tagged audio signals), or any suitable combination thereof. In addition, a variety of information can be derived via the communication components 1264, such as location via Internet Protocol (IP) geolocation, location via WI-FI® signal triangulation, location via detecting a BLUETOOTH® or NFC beacon signal that may indicate a particular location, and so forth.

Transmission Medium

In various example embodiments, portions of the network 1280 can be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a WI-FI® network, another type of network, or a combination of two or more such networks. For example, the network 1280 or a portion of the network 1280 may include a wireless or cellular network, and the coupling 1282 may be a Code Division Multiple Access (CDMA) connection, a Global System for Mobile communications (GSM) connection, or another type of cellular or wireless coupling. In this example, the coupling 1282 can implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

In example embodiments, the instructions 1216 are transmitted or received over the network 1280 using a transmission medium via a network interface device (e.g., a network interface component included in the communication components 1264) and utilizing any one of a number of well-known transfer protocols (e.g., Hypertext Transfer Protocol (HTTP)). Similarly, in other example embodiments, the instructions 1216 are transmitted or received using a transmission medium via the coupling 1272 (e.g., a peer-to-peer coupling) to the devices 1270. The term "transmission medium" shall be taken to include any intangible medium that is capable of storing, encoding, or carrying the instructions 1216 for execution by the machine 1200, and includes digital or analog communications signals or other intangible media to facilitate communication of such software.

Furthermore, the machine-readable medium 1238 is non-transitory (in other words, not having any transitory signals) in that it does not embody a propagating signal. However, labeling the machine-readable medium 1238 "non-transitory" should not be construed to mean that the medium is incapable of movement; the medium should be considered as being transportable from one physical location to another. Additionally, since the machine-readable medium 1238 is tangible, the medium may be considered to be a machine-readable device.

Language

Throughout this specification, plural instances may implement components, operations, or structures described as a single instance. Although individual operations of methods are illustrated and described as separate operations, individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A computer implemented method, comprising:
   accessing a set of images within a video stream;
   identifying an object of interest in one or more images of the set of images, the object of interest having a first portion and a second portion;
   detecting a region of interest within the one or more images;
   generating one or more binarization matrices from the one or more images;
   determining a pixel radius;
   filtering the one or more binarization matrices to exchange a first pixel value for a second pixel value where a pixel associated with the first pixel value is proximate to a set of pixels of the second pixel value;
   identifying a first set of median pixels of the first portion and a second set of median pixels of the second portion;
   determining a polyline approximating the first portion and the second portion of the object of interest; and
   generating a model for the polyline.

2. The method of claim 1, wherein identifying the first set of median pixels for the first portion and the second set of median pixels for the second portion further comprises:
   identifying a first set of median pixels for the first portion of the object of interest, the first set of median pixels being a median pixel in each column, of the one or more binarization matrices, having a pixel associated with the first portion of the object of interest;
   identifying a second set of median pixels for the second portion of the object of interest, the second set of median pixels being a median pixel in each column, of the one or more binarization matrices, having a pixel associated with the second portion of the object of interest; and
   isolating the first set of median pixels and the second set of median pixels within the one or more binarization matrices from the remaining pixels.

3. The method of claim 2, wherein determining the polyline further comprises:
   determining a bend position between the first portion and the second portion of the object of interest;
   determining a first line extending in a first direction from the bend position, the first line extending across one or more of the first set of median pixels; and
   determining a second line extending in a second direction from the bend position, the second line extending across one or more of the second set of median pixels.

4. The method of claim 3, wherein generating the model for the polyline further comprises:
   determining a length for the first line and the second line;
   determining a bend angle for the bend position; and
   determining a slope angle for the first portion of the object of interest.

5. The method of claim 1 further comprising:
   determining a first thickness of the first portion of the object of interest; and
   determining a second thickness of the second portion of the object of interest.

6. The method of claim 1, wherein generating the model for the polyline further comprises:
   generating an averaged model based on a model generated for each image of the set of images of the video stream.

7. A system, comprising:
   one or more processors; and
   a non-transitory processor-readable storage medium storing processor executable instructions that, when executed by the one or more processors, cause the one or more processors to perform operations comprising:
   accessing a set of images within a video stream;
   identifying an object of interest in one or more images of the set of images, the object of interest having a first portion and a second portion;
   detecting a region of interest within the one or more images;
   generating one or more binarization matrices from the one or more images;
   determining a pixel radius;
   filtering the one or more binarization matrices to exchange a first pixel value for a second pixel value where a pixel associated with the first pixel value is proximate to a set of pixels of the second pixel value;
   identifying a first set of median pixels of the first portion and a second set of median pixels of the second portion;
   determining a polyline approximating the first portion and the second portion of the object of interest; and
   generating a model for the polyline.

8. The system of claim 7, wherein identifying the first set of median pixels for the first portion and the second set of median pixels for the second portion further comprises:
   identifying a first set of median pixels for the first portion of the object of interest, the first set of median pixels being a median pixel in each column, of the one or more binarization matrices, having a pixel associated with the first portion of the object of interest;
   identifying a second set of median pixels for the second portion of the object of interest, the second set of median pixels being a median pixel in each column, of the one or more binarization matrices, having a pixel associated with the second portion of the object of interest; and
   isolating the first set of median pixels and the second set of median pixels within the one or more binarization matrices from the remaining pixels.

9. The system of claim 8, wherein determining the polyline further comprises:
   determining a bend position between the first portion and the second portion of the object of interest;
   determining a first line extending in a first direction from the bend position, the first line extending across one or more of the first set of median pixels; and
   determining a second line extending in a second direction from the bend position, the second line extending across one or more of the second set of median pixels.

10. The system of claim 9, wherein generating the model for the polyline further comprises:
    determining a length for the first line and the second line;
    determining a bend angle for the bend position; and
    determining a slope angle for the first portion of the object of interest.

11. The system of claim 7, wherein the operations further comprise:
    determining a first thickness of the first portion of the object of interest; and
    determining a second thickness of the second portion of the object of interest.

12. The system of claim 7, wherein generating the model for the polyline further comprises:
    generating an averaged model based on a model generated for each image of the set of images of the video stream.

13. A non-transitory processor-readable storage medium storing processor executable instructions that, when executed by a processor of a machine, cause the machine to perform operations comprising:
    accessing a set of images within a video stream;
    identifying an object of interest in one or more images of the set of images, the object of interest having a first portion and a second portion;
    detecting a region of interest within the one or more images;
    generating one or more binarization matrices from the one or more images;
    determining a pixel radius;
    filtering the one or more binarization matrices to exchange a first pixel value for a second pixel value where a pixel associated with the first pixel value is proximate to a set of pixels of the second pixel value;
    identifying a first set of median pixels of the first portion and a second set of median pixels of the second portion;
    determining a polyline approximating the first portion and the second portion of the object of interest; and
    generating a model for the polyline.

14. The non-transitory processor-readable storage medium of claim 13, wherein identifying the first set of median pixels for the first portion and the second set of median pixels for the second portion further comprises:
    identifying a first set of median pixels for the first portion of the object of interest, the first set of median pixels being a median pixel in each column, of the one or more binarization matrices, having a pixel associated with the first portion of the object of interest;
    identifying a second set of median pixels for the second portion of the object of interest, the second set of median pixels being a median pixel in each column, of the one or more binarization matrices, having a pixel associated with the second portion of the object of interest; and
    isolating the first set of median pixels and the second set of median pixels within the one or more binarization matrices from the remaining pixels.

15. The non-transitory processor-readable storage medium of claim 14, wherein determining the polyline further comprises:
    determining a bend position between the first portion and the second portion of the object of interest;
    determining a first line extending in a first direction from the bend position, the first line extending across one or more of the first set of median pixels; and
    determining a second line extending in a second direction from the bend position, the second line extending across one or more of the second set of median pixels.

16. The non-transitory processor-readable storage medium of claim 15, wherein generating the model for the polyline further comprises:
    determining a length for the first line and the second line;
    determining a bend angle for the bend position; and determining a slope angle for the first portion of the object of interest.

17. The non-transitory processor-readable storage medium of claim 13, wherein the operations further comprise:
   determining a first thickness of the first portion of the object of interest; and
   determining a second thickness of the second portion of the object of interest.

18. The non-transitory processor-readable storage medium of claim 13, wherein generating the model for the polyline further comprises:
   generating an averaged model based on a model generated for each image of the set of images of the video stream.

* * * * *